United States Patent [19]

Sazaki et al.

[11] Patent Number: 4,502,645
[45] Date of Patent: Mar. 5, 1985

[54] FISHING SPINNING REELS

[75] Inventors: Kounin Sazaki; Hideo Murakami, both of Fukuyama, Japan

[73] Assignee: Ryobi Limited, Hiroshima, Japan

[21] Appl. No.: 401,901

[22] Filed: Jul. 26, 1982

[30] Foreign Application Priority Data

Jul. 28, 1981 [JP] Japan ............................ 56-112825[U]

[51] Int. Cl.³ ............................................. A01K 89/01
[52] U.S. Cl. ............................................. 242/84.2 G
[58] Field of Search ................... 242/84.21 R, 84.2 G, 242/84.2 R

[56] References Cited

U.S. PATENT DOCUMENTS 2,966,314 12/1960 Mombur ...................... 242/84.21 R
4,098,473 7/1978 Sazaki .............................. 242/84.2 G
4,147,313 4/1979 Sazaki .............................. 242/84.2 G Primary Examiner—Billy S. Taylor
Attorney, Agent, or Firm—Frishauf, Holtz, Goodman and Woodward

[57] ABSTRACT

A fishing spinning reel in which one of a bail arm lever and a pivot cam which is biased by a spring is held at its line-casting position by a first stopper arranged in the arm while it is held at its line-rewinding position by a second stopper also arranged in the arm. The second stopper is disengaged when a bail arm is rotated over a predetermined angle in the counter-clockwise direction against the biasing force of a spring so that the bail arm is automatically turned to its line-casting position.

9 Claims, 5 Drawing Figures

FISHING SPINNING REELS

BACKGROUND OF THE INVENTION

This invention relates to a fishing spinning reel, and more particularly to a bail arm reversing mechanism thereof.

In a prior art bail arm mechanism such as disclosed in U.S. Pat. Nos. 4,098,473 and 4,147,313, bail arm ends are secured to a bail arm lever and a pivot cam respectively mounted on a pair of arms formed on a periphery of a rotor at diametrically opposing positions, and the bail arm is biased to swing selectively toward its line-casting and line-rewinding positions by a spring, the dead point of which being set between said two positions, and the bail arm is automatically reversed to its line-rewinding position when the rotor is rotated by a handle after the string is casted.

In the prior art construction, however, the bail arm is to be manually turned to its line-casting position. This is inconvenient to quick operation thereof. Moreover, when the string is to be casted, the bail arm must be at its line-casting position from the start thereof so that it is difficult to utilize a reaction of a sinker and so on at the time of throwing.

SUMMARY OF THE INVENTION

It is, therefore, an object of this invention to provide an improved fishing spinning reel capable of rapidly turning the bail arm from its line-rewinding position to its line-casting position.

Another object of this invention is to provide an improved fishing spinning reel capable of throwing a string by utilizing a reaction of a sinker and so on.

According to the present invention, there is provided a fishing spinning reel comprising a main body of a reel; a rotor supported by said main body and provided with a pair of arms formed on a periphery of said rotor at diametrically opposing positions; a bail arm lever and a pivot cam mounted on said pair of arms respectively; a torsion spring for biasing one of said bail arm lever and the pivot cam toward a string-casting position; a bail arm having both ends secured to said bail arm lever and pivot cam; a first stopper for holding said one of the bail arm lever and pivot cam in its line-casting position; and a second stopper for holding said one of the bail arm lever and pivot cam in its line-rewinding position, said second stopper being disengaged when said the bail arm is rotated over a predetermined angle against the biasing force of said torsion spring, thereby turning the bail arm to its line-casting position.

DESCRIPTION OF THE PREFERRED EMBODIMENT

Figure 1:
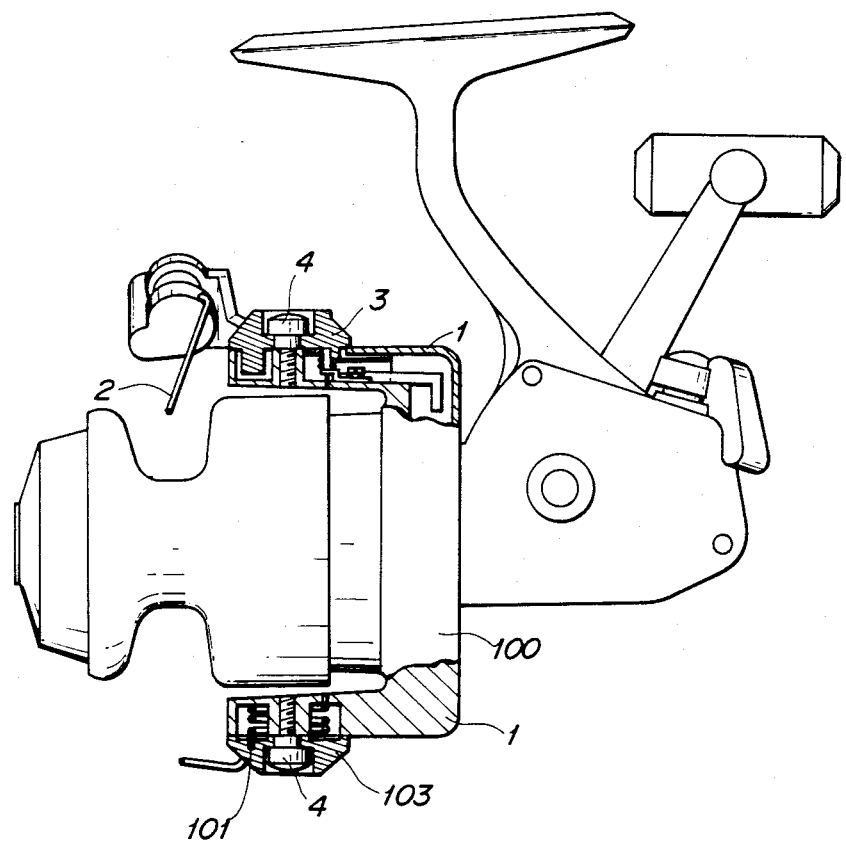
FIG. 1 shows a side view, partly in cross section of a fishing spinning reel embodying the invention.
Figure 2:
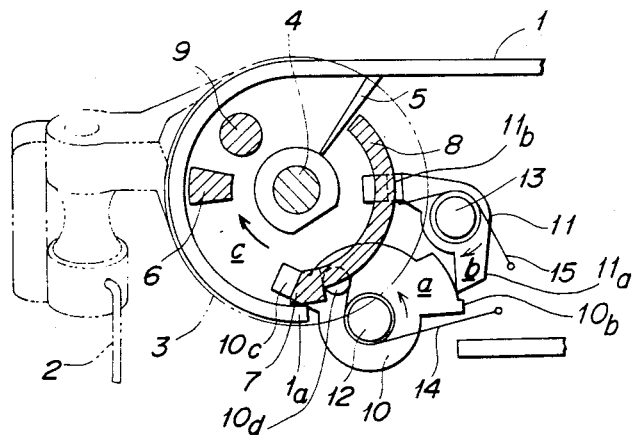
FIGS. 2, 3 and 4 are enlarged explanatory plan views of the bail arm reversing mechanism in its line-rewinding state, in its turning state and in its line-casting state, respectively.
Figure 4:
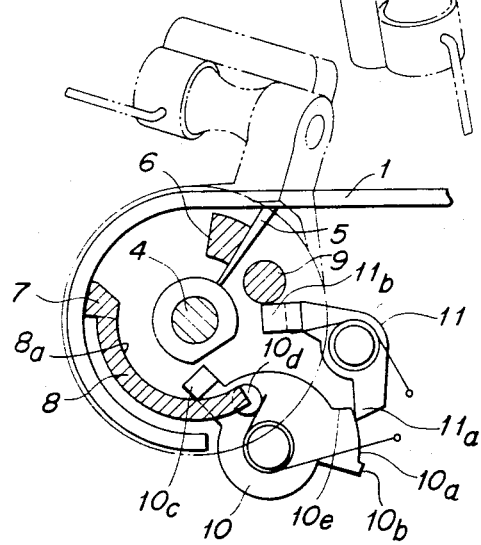

As shown in FIGS. 1 and 2, each end of a bail arm 2 is secured to a pivot cam 103 and a bail arm lever 3 each shouldered by step screws 4, 4 on a pair of arms 1, 1 oppositely disposed at both sides of a rotor 100. The bail arm 2 is biased by a torsion spring 101 to rotate in the direction c shown in FIG. 2, and is held at its line-casting position by the engagement of a boss 6 projected inwardly from the bail arm lever 3 with a stopper 5 provided at the bottom wall of the arm 1, as shown in FIG. 4. On the inner side surface of the bail arm lever 3, further projected are an elongated arcuate cam 8, a boss 7 formed at one end of the arcuate cam 8 with an excess height, and a pin 9. At the bottom wall of the arm 1, a stopper 10 and a pawl 11 are rotatably supported by pins 12 and 13 respectively and arranged in such a distance as being capable of engaging each other. The stopper 10 is biased to rotate in the direction a (see FIG. 2) by a spring 14 while the pawl 11 is biased to rotate in the direction b (see FIG. 2) by a spring 5. However, the stopper 10 is held at its line-rewinding position by engagement with the end 1a of the arm 1 as well as by engagement of a projection 10b with one end 11a of the pawl 11, as shown in FIG. 2. One of the former or the latter engagements may be, however, omitted without any disadvantage.

The stopper 10 is provided with a projection 10c to be contacted with the boss 7 during the line-rewinding operation, a boss 10d to be contacted with the boss 7 and a step 10e at the periphery 10a to engage the one end 11a of the pawl 11 when the bail arm lever 3 is slightly rotated in the reversed direction of the arrow c. The pawl 11 is provided with a vertically-bent-up end 11b to be contacted with the pin 9 and rotated in the reverse direction of the arrow b when the bail arm lever 3 is rotated to its line-casting position. The other end 11a of pawl 11 is formed to engage the step 10e of the stopper 10 when the stopper 10 is rotated in the reverse direction of the arrow a by said slight rotation of the bail arm lever 3.

The elements of the bail arm reversing mechanism mounted on the arm 1 carrying the bail arm lever 3 may be arranged in the other arm carrying the pivot cam 103.

Figure 3:
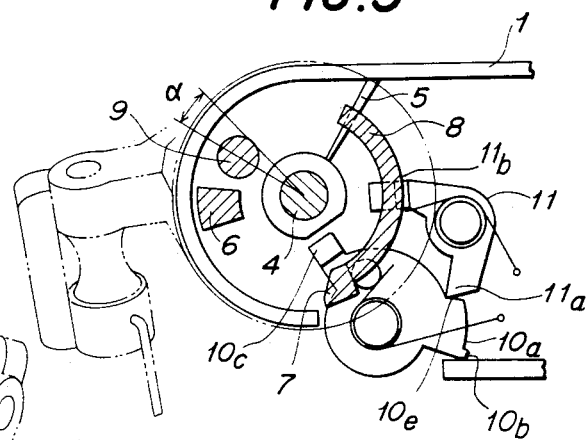

With the construction as above explained, when the rotation force is applied to the bail arm lever 3 to rotate it over the predetermined angle α in the reverse direction of the arrow c of FIG. 2, the engagement of the boss 7 with the portion 10c is released and the stopper 10 is rotated in the reverse direction of the arrow a by the engagement of the boss 7 and the boss 10d, as shown in FIG. 3. After the rotating force is released, the bail aim lever 3 and pivot cam 103 are then rotated by the biasing force of the spring 101 (FIG. 1) in the reverse direction to its line-casting position as shown in FIG. 4. It is advantageous to set the angle α at about 15°. During the line-rewinding operation, the rotation of the bail arm lever 3 in the direction c is prevented by the engagement of the portion 10c of the stopper 10 which is biased to rotate in the direction a with the boss 7 provided on the bail arm lever 3, as shown in FIG. 2.

When the bail arm lever 3 is rotated in the reverse direction over the predetermined angle, the boss 6 contacts the stopper 5 so that the bail arm 2 is held in its line-casting position. At this time, the pin 9 pushes the end 11b of the pawl 11 to rotate it over the certain angle in the reverse direction of the arrow b against the biasing force of the spring 15, as shown in FIG. 4. In this position, since the end 11a is released from the step 10e of the stopper 10 by the rotation of the pawl 11 in the reverse direction of the arrow b, the stopper 10 is rotated in the direction a by the spring 14 so that the portion 10c engages the inner surface 8a of the cam 8. When the bail arm lever 3 is rotated in the reverse direction of the arrow c, the portion 10c slides along the surface 8a of the cam 8 and the pin 9 disengages the pawl 11. Thereby, the portion 10c engages the boss 7 as shown in FIG. 2.

Figure 5:
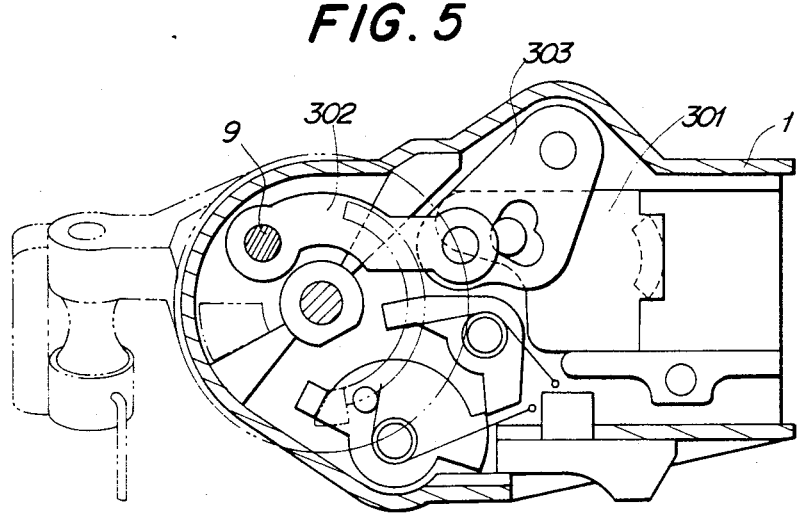
FIG. 5 is an enlarged explanatory plan view of another embodiment of the bail arm reversing mechanism.

FIG. 5 illustrates another embodiment of this invention in which an L-shaped kick lever 301 is moved in the left side direction in response to the rotation of the rotor 100 the same as disclosed in U.S. Pat. No. 4,147,313. The sliding movement of the kick lever 301 is amplified by and transferred to a connecting lever 302 (mounted on a pin 9) through a link lever 303 swingably pivoted on the bottom wall of the arm 1, and the connecting lever 302 rotates the bail arm lever 3 in the counter-clockwise direction over a large angle. When the bail arm lever 3 is rotated in the clockwise direction, the connecting lever 302 slides the kick lever 300 to its original position through the link lever 301.

As explained hereinabove, according to the fishing spinning reel embodying the invention, after the bail arm lever 3 is slightly rotated by applying pressing force thereon against the biasing force of the torsion spring 101, the bail arm 2 is automatically quickly and accurately turned to its line-casting position by releasing the pressing force. Accordingly, it is possible to start the throwing motion with holding the bail arm in its line-rewinding state and to throw the string by utilizing the reaction of the sinker and so on. Moreover, the stopper 10 and the pawl 11 are arranged near the bail arm lever 3 so that the bail arm reversing mechanism is a compact one.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A fishing spinning reel comprising:
   a main body of a reel;
   a rotor supported by said main body and provided with a pair of arms formed on a periphery of said rotor at diametrically opposing positions of said rotor, at least one of said arms having a bottom surface;
   a bail arm lever and a pivot cam mounted on said pair of arms respectively;
   a torsion spring for biasing one of said bail arm lever and pivot cam toward a line-casting position;
   said one of said bail arm lever and pivot cam being provided with an arcuate cam having a boss at one end thereof;
   a bail arm having both ends secured to said bail arm lever and pivot cam;
   a first stopper mounted on the bottom surface of said one of said arms for holding said one of said bail arm lever and pivot cam in its line-casting position:
   said one of said bail arm lever and pivot cam having a boss projected inwardly therefrom for engaging said first stopper mounted to hold said bail arm in its line-casting position against the biasing force of said torsion spring;
   a kick lever arranged in one of said arms and being slidable in the lateral direction of said one of said arms in response to the rotation of said rotor;
   a second stopper pivotally mounted on the bottom surface of said one of said arms for holding said one of said bail arm lever and pivot cam in its line-rewinding position, said second stopper being disengaged from holding said one of said bail arm lever and pivot cam when said bail arm is rotated over a predetermined angle against the biasing force of said torsion spring, thereby turning said bail arm to its line-casting position by the biasing force of said torsion spring;
   a second spring coupled to said second stopper for biasing said second stopper in the counter-clockwise direction;
   a projection provided at the periphery of said second stopper, and a boss projected from said second stopper, said projection of said second stopper engaging said boss of said arcuate cam to hold said one of said bail arm lever and pivot cam in its line-rewinding position, said boss projected from said second stopper being pushed by said boss of said arcuate cam to rotate said second stopper in the clockwise direction against the biasing force of said second spring when said bail arm is rotated in the counter-clockwise direction so as to disengage said projection of said second stopper from said boss of the arcuate cam;
   a step formed on the periphery of said second stopper;
   a pawl pivotally mounted on the bottom surface of said one of said arms, and means for biasing said pawl in the clockwise direction, one end of said pawl engaging said step of said second stopper to hold said second stopper in such a position that said arcuate cam is freely rotatable in the clockwise direction; and
   said one of said bail arm lever and pivot cam having a pin inwardly projected therefrom for rotating said pawl against the biasing force thereof, thereby releasing said one end of said pawl from said step of said second stopper so as to return said second stopper to its original position.

2. The fishing spinning reel of claim 1, further comprising a connecting lever secured to said one of said bail arm lever and pivot cam at one end thereof; and a link lever swingably mounted on said one arm and interconnected with said kick lever and said connecting lever so as to amplify and transfer the sliding movement of said kick lever to said bail arm.

3. A fishing spinning reel comprising:
   a main body of a reel;
   a rotor supported by said main body and provided with a pair of arms formed on a periphery of said rotor at diametrically opposing positions of said rotor, at least one of said arms having a bottom surface;
   a bail arm lever and a pivot cam mounted on said pair of arms respectively;
   first biasing means for biasing one of said bail arm lever and pivot cam toward a line-casting position;
   said one of said bail arm lever and pivot cam being provided with an elongated cam having a boss at one end thereof;
   a bail arm having both ends secured to said bail arm lever and pivot cam;
   a first stopper mounted on the bottom surface of said one of said arms for holding said one of said bail arm lever and pivot cam in its line-casting position;
   said one of said bail arm lever and pivot cam having a boss projected inwardly therefrom for engaging said first stopper mounted to hold said bail arm in its line-casting position against the biasing force of said first biasing means;

a kick lever arranged in one of said arms and being slidable in the lateral direction of said one of said arms in response to the rotation of said rotor;

a second stopper pivotally mounted on the bottom surface of said one of said arms for holding said one of said bail arm lever and pivot cam in its line-rewinding position, said second stopper being disengaged from holding said one of said bail arm lever and pivot cam when said bail arm is rotated over a predetermined angle against the biasing force of said first biasing means, thereby turning said bail arm to its line-casting position by the biasing force of said first biasing means;

second biasing means coupled to said second stopper for biasing said second stopper in the counter-clockwise direction;

engaging means provided on said second stopper for engaging said boss of said elongated cam to hold said one of said bail arm lever and pivot cam in its line-rewinding position, and for rotating said second stopper in the clockwise direction against the biasing force of said second biasing means when said bail arm is rotated in the counter-clockwise direction so as to cause disengagement of said engaging means from said boss of said elongated cam;

stop means formed on the periphery of said second stopper;

second engaging means pivotally mounted on the bottom surface of said one of said arms; and means for biasing said second engagement means in the clockwise direction;

one end of said second engaging means engaging said stop means of said second stopper to hold said second stopper in such a position that said elongated cam is freely rotatable in the clockwise direction; and said one of said bail arm lever and pivot cam having mans inwardly projected therefrom for rotating said second engaging means against the biasing force thereof, thereby releasing said one end of said second engaging means from said stop means of said second stopper so as to return said second stopper to its original position.

4. The fishing spinning reel of claim 3, wherein said first and second biasing means comprise respective torsion springs.

5. The fishing spinning reel of claim 3, wherein said elongated cam comprises an arcuate cam.

6. The fishing spinning reel of claim 3, wherein said engaging means on said second stopper comprises a projection provided on the periphery of said second stopper and a boss projected from said second stopper, said projection of said second stopper engaging said boss of said elongated cam to hold said one of said bail arm lever and pivot cam in its line-rewinding position, and said boss projected from said second stopper being pushed by said boss of said elongated cam to rotate said second stopper in the clockwise direction against the biasing force of said second biasing means when said bail arm is rotated in the counter-clockwise direction so as to disengage said projection of said second stopper from said boss of said elongated cam.

7. The fishing spinning reel of claim 5, wherein said elongated cam comprises an arcuate cam, and wherein said first and second biasing means comprise respective torsion springs.

8. The fishing spinning reel of claim 7, wherein said stop means formed on the periphery of said second stopper comprises a step, and wherein said second engaging means mounted on the bottom surface of said one of said arms comprises a pawl having one end which engages said step of said second stopper to hold said second stopper in such a position that said arcuate cam is freely rotatable in the clockwise direction.

9. The fishing spinning reel of claim 3, further comprising a connecting lever secured to said one of said bail arm lever and pivot cam at one end thereof; and a link lever swingably mounted on said one arm and interconnected with said kick lever and said connecting lever so as to amplify and transfer the sliding movement of said kick lever to said bail arm.

* * * * *